US008875255B1

(12) United States Patent
Dotan et al.

(10) Patent No.: US 8,875,255 B1
(45) Date of Patent: Oct. 28, 2014

(54) PREVENTING USER ENUMERATION BY AN AUTHENTICATION SERVER

(71) Applicant: EMC Corporation, Hopkinton, MA (US)

(72) Inventors: Yedidya Dotan, Newton, MA (US); John Alexander Murray, Waltham, MA (US)

(73) Assignee: EMC Corporation, Hopkinton, MA (US)

( * ) Notice: Subject to any disclaimer, the term of this patent is extended or adjusted under 35 U.S.C. 154(b) by 6 days.

(21) Appl. No.: 13/630,003

(22) Filed: Sep. 28, 2012

(51) Int. Cl.
*G06F 21/31* (2013.01)
*H04L 29/06* (2006.01)

(52) U.S. Cl.
CPC .............. *H04L 63/08* (2013.01); *H04L 63/083* (2013.01); *G06F 21/31* (2013.01)
USPC ............................................. 726/5; 713/182

(58) Field of Classification Search
CPC ........ H04L 63/08; H04L 63/083; G06F 21/31
USPC .............................................. 726/5; 713/182
See application file for complete search history.

(56) References Cited

U.S. PATENT DOCUMENTS

| 5,036,461 | A | 7/1991 | Elliot et al. | |
|---|---|---|---|---|
| 7,350,083 | B2 * | 3/2008 | Wells et al. | 713/193 |
| 7,599,856 | B2 | 10/2009 | Agrawal et al. | |
| 7,849,323 | B2 | 12/2010 | Field et al. | |
| 7,865,414 | B2 | 1/2011 | Fung et al. | |
| 8,181,262 | B2 | 5/2012 | Cooper et al. | |
| 8,438,617 | B2 | 5/2013 | Brainard et al. | |
| 2004/0167859 | A1 * | 8/2004 | Mirabella | 705/59 |
| 2011/0126273 | A1 * | 5/2011 | Bhatia et al. | 726/7 |
| 2012/0159177 | A1 * | 6/2012 | Bajaj et al. | 713/176 |
| 2013/0165157 | A1 * | 6/2013 | Mapes | 455/456.5 |
| 2014/0050370 | A1 * | 2/2014 | Inkumsah et al. | 382/117 |

OTHER PUBLICATIONS

Seong-Pyo Hong, Supporting Secure Authentication and Privacy in Wireless Computing, Date of Conference: Nov. 9-11, 2006 , pp. 594-599, IEEE.*
Wright et al, The IT Regulatory and Standards Compliance Handbook:: How to Survive Information Systems Audit and Assessments, 2008, ISBN: 9781597492669, ACM.*

* cited by examiner

*Primary Examiner* — Yin-Chen Shaw
*Assistant Examiner* — Gita Faramarzi
(74) *Attorney, Agent, or Firm* — BainwoodHuang (57) ABSTRACT

An enumeration prevention technique involves receiving an authentication session request which includes a validation result indicating whether a user identifier supplied by the user identifies a valid user entry in a user database. The technique further involves providing a genuine authentication session response when the validation result indicates that the user identifier does identify a valid user entry in the user database. The genuine authentication session response includes a user-expected set of artifacts to confirm authenticity of the authentication server to the user. The technique further involves providing a faux authentication session response when the validation result indicates that the user identifier does not identify a valid user entry in the user database. The faux authentication session response includes a machine-selected set of artifacts enabling the faux authentication session response to resemble a genuine authentication session response.

23 Claims, 5 Drawing Sheets

PREVENTING USER ENUMERATION BY AN AUTHENTICATION SERVER

BACKGROUND

Two-way authentication between a person and an authentication device involves (i) the authentication device authenticating to that person, and (ii) that person authenticating to the authentication device. The authentication device authenticates to that person to indicate that the authentication device is legitimate rather than malicious (e.g., that the authentication device is not a phishing device attempting to steal that person's password and other information). The person authenticates to the authentication device to show that the person is legitimate rather than an imposter.

One conventional two-way authentication approach involves the person initially submitting a username to the authentication device. If the authentication device does not find that username in its database, the authentication device informs the person that the username is incorrect (e.g., perhaps the username was mistyped) and allows that person to re-enter the username. If the authentication device finds the username in its database, the authentication device provides the person with evidence that the authentication device is legitimate such as a selected picture or a catch phrase that was provided earlier to the authentication device by that person (e.g., during a setup session).

Once that person is convinced that the authentication device is legitimate, that person then authenticates to the authentication device. In particular, the person provides password information to the authentication device to show the authentication device that the person is legitimate and not an imposter.

SUMMARY

Unfortunately, there are deficiencies in the above-described conventional two-way authentication approach which involves informing the person that a username is incorrect. In particular, when the authentication device indicates that the username is incorrect, the authentication device is essentially acknowledging that the username is not used by the database of the authentication device. Similarly, when the authentication device provides evidence to the person to show that person that the authentication device is legitimate, the authentication device is essentially acknowledging that the username is in the database of the authentication device. Accordingly, a malicious person (e.g., an attacker attempting to circumvent security by learning usernames in the database) may be able to guess at various possible usernames used by an authentication device and determine whether those usernames are actually used by the authentication device based on what the authentication device provides back in response. Such a disclosure is referred to as "enumeration" and may be considered as a security weakness.

In contrast to the above-described conventional two-way authentication approach which indicates whether a username is incorrect, improved techniques involve providing artificial or faux authentication session responses which resemble genuine authentication session responses from an authentication server. For example, in response to a recognized user identifier such as a username from a user, suppose that the authentication server is configured to authenticate to the user by providing evidence showing the user that the authentication server is legitimate such as a picture or a catch phrase that was chosen earlier by the user. For this situation, the improved techniques may involve providing artificial evidence, i.e., pictures or catch phrases, even when the authentication server does not recognize user identifiers. Such operation prevents a malicious person from determining whether or not a user identifier is actually used by the authentication server since genuine authentication session responses as well as faux authentication session responses include evidence from the authentication server. To cover a situation in which a legitimate user mistypes a user identifier which generates a faux authentication session response, the authentication server still offers the user an option of re-typing the user identifier when the user does not recognize the artificial evidence of the faux authentication session response.

One embodiment is directed to a method of prompting a user to authenticate to an authentication server. The method includes receiving an authentication session request which includes a validation result indicating whether a user identifier (e.g., a username) supplied by the user identifies a valid user entry in a user database. The method further includes providing a genuine authentication session response when the validation result indicates that the user identifier does identify a valid user entry in the user database. The genuine authentication session response includes (i) a user-expected set of artifacts to confirm authenticity of the authentication server to the user and (ii) a prompt for the user to enter a password to confirm authenticity of the user to the authentication server. The method further includes providing a faux authentication session response when the validation result indicates that the user identifier does not identify a valid user entry in the user database. The faux authentication session response includes (i) a machine-selected (or fake) set of artifacts and (ii) a prompt for the user to enter a password enabling the faux authentication session response to resemble a genuine authentication session response.

In some arrangements, server-side equipment may include a third-party apparatus (e.g., an online banking server) and an authentication server which work together to control user access. In these arrangements, when the server-side equipment (e.g., the third-party equipment) initially receives an access request having a user identifier, the server-side equipment first performs a validation operation to validate the user. If the user identifier is not recognized by the server-side equipment, the server-side equipment considers the user request to be invalid and responds with fake artifacts (e.g., a fake picture, a fake secret question, a fake pass phrase, etc. provided by the authentication server). It should be understood that the term "fake" means that the artifacts were selected artificially rather than selected by a valid user.

In some arrangements, the server-side equipment generates a repeatable fake artifact over at least a short time span (e.g., a month) in the event of a malicious attack. In some arrangements, the server-side equipment performs a simple modulo of the user identifier value to obtain an index to a pool of fake artifacts. In other arrangements, the server-side equipment applies a hash function to the user identifier to generate such an index. In yet other arrangements, the server-side equipment applies a hash function to the user identifier in combination with date information in order to generate a first index for a period of time (e.g., a month) and generate a second index thereafter to simulate user behavior of switching the repeatable fake artifact over time.

In some arrangements, the server-side equipment performs back-end analysis such as velocity detection of the user device based on an address of the user device (e.g., for early detection of user enumeration attacks using the existing features in adaptive authentication but with a new collection point). In some arrangements, the server-side equipment tallies the number of failed authentication attempts not followed by a successful one or with minor errors in user identifier value (e.g., username) to identify user enumeration attacks. In some arrangements, the server-side equipment responds to a detected enumeration attack by sending a beacon (rather than just artificial artifacts) to collect more information about the user device.

It should be understood that, in the cloud context, the server-side equipment is formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various processes, electronic components and circuitry which are involved in preventing user enumeration.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique involves providing an artificial or faux authentication session response which resembles a genuine authentication session response from an authentication server when a user identifier (ID) such as a username or a user number is not recognized. For example, in response to a recognized user ID from a user, suppose that the authentication server is configured to authenticate to the user by providing genuine evidence showing the user that the authentication server is legitimate such as a picture or a catch phrase that was chosen earlier by the user. To prevent user enumeration, the improved technique may involve providing a faux authentication session including artificial evidence (i.e., a machine-selected picture or catch phrase) when a user ID is not recognized. Such operation prevents a malicious person from determining whether or not the user ID is actually used by the authentication server since the faux authentication session includes evidence in the same manner as a genuine authentication session. Moreover, if a legitimate user incorrectly types a real user ID, the authentication server may still offer an option of allowing user ID re-submission, i.e., instruct the user to re-submit the user ID if the user does not recognize the artificial evidence of the faux authentication session response.

Figure 1:
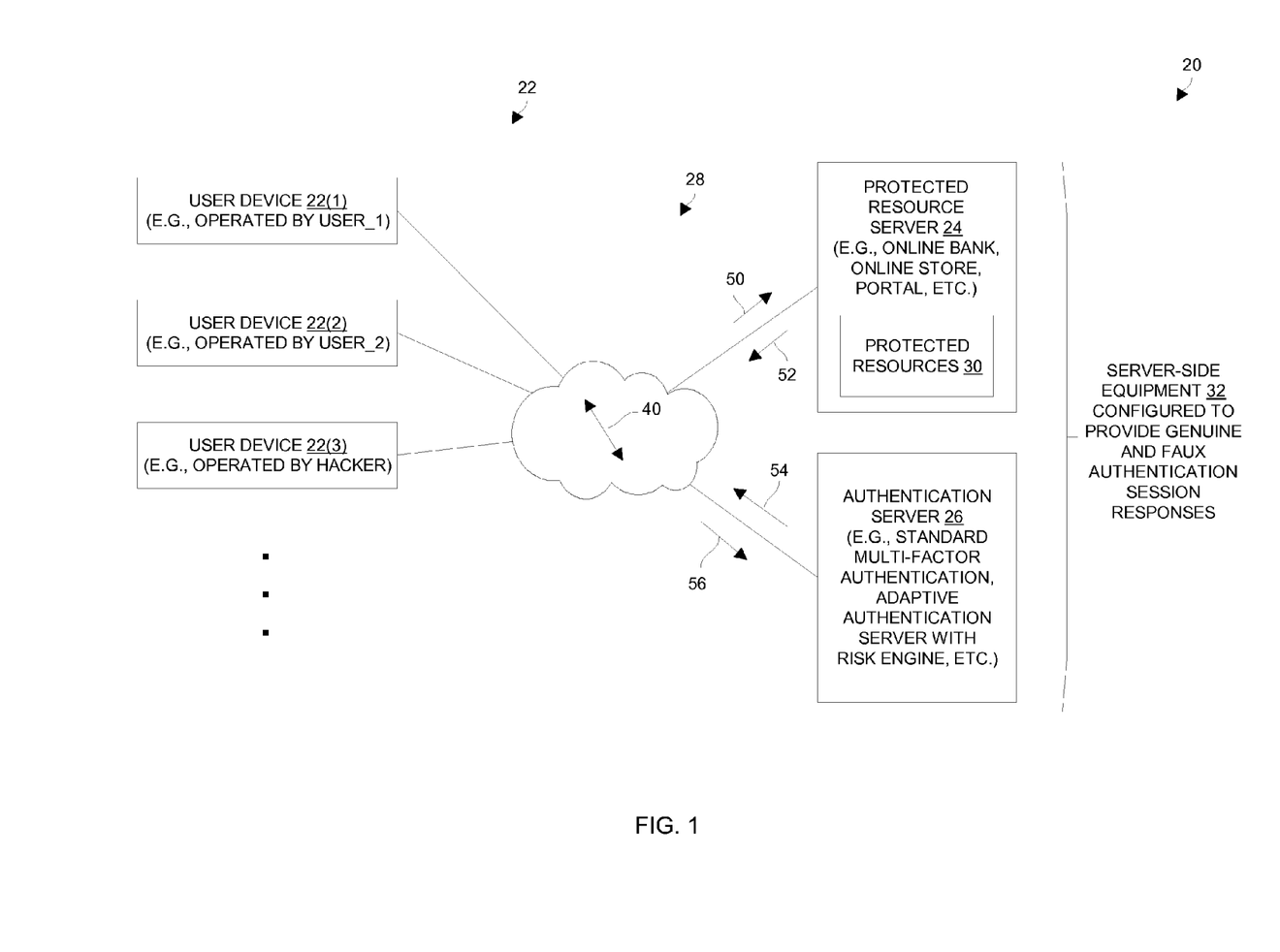
FIG. 1 is a block diagram of an electronic environment which is configured for prevention of user enumeration.

FIG. 1 shows an electronic environment 20 which enables users to engage in two-way authentication to access a protected computerized resource. The electronic environment 20 includes user devices 22(1), 22(2), 22(3) . . . (collectively, user devices 22), a protected resource server 24, an authentication server 26, and a communications medium 28.

Each user device 22 is able to access a protected resource 30 of the protected resource server 24 if a user of that user device 22 is able to successfully authenticate with the authentication server 26. By way of example, a first user USER_1 operates user device 22(1), a second user USER_2 operates user device 22(2), and a hacker (or malicious person) operates user device 22(3). Suitable user devices 22 include general purpose computers, laptops, tablet devices, smart phones, etc.

The protected resource server 24 is constructed and arranged to grant or deny a user device 22 access to the protected resources 30 depending on whether the user of that user device 22 successfully validates with the protected resource server 24 and authenticates with the authentication server 26. The protected resources 30 may include any types of resources that are protectable via electronic security. Along these lines, the protected resource server 24 may be an online financial institution (e.g., an online bank, an online brokerage service, etc.) and the protected resources 30 may include access to a user account, access to protected financial data, the ability to complete online transactions, etc. Additionally, the protected resource server 24 may be an online store (e.g., an online retailer, an online auction site, etc.) and the protected resources 30 may include the ability to complete online purchases, the ability to download online content such as books, music, movies, etc. Furthermore, the protected resource server may operate as a portal or a gateway, and the protected resource may include access via that portal (e.g., VPN access, corporate intranet access, access to a remote file server, etc.), and so on.

The authentication server 26 is constructed and arranged to support the operation of the protected resource server 24 by performing authentication operations on request. That is, the authentication server 26 provides the results of the authentication operations to the protected resource server 24, and the protected resource server grants access to the protected resource 30 when authentication is successful. Accordingly, the protected resource server 24 and the authentication server 26 work cooperatively and can be viewed as server-side equipment 32 from the perspective of the user devices 22.

The communications medium 28 connects the various components of the electronic environment 20 together to enable the various components to exchange electronic signals 40 (e.g., see the double arrow 40). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, or combinations thereof.

During operation, users of the user devices 22 send access requests 50 which include user IDs to the protected resource server 24 when attempting to gain access to the protected resources 30. Upon receipt of an access request 50, the protected resource server 24 performs a validation operation based on the user ID of that access request 50. In particular, if the protected resource server 24 recognizes the user ID, the protected resource server 24 sends an authentication request 52 which includes a validation result indicating successful validation (i.e., the user ID is recognized) and the user ID to the authentication server 26. However, if the protected resource server 24 does not recognize the user ID (e.g., due to a mistyped user ID, due to an enumeration attack from a hacker, etc.), the protected resource server 24 sends an authentication request 52 which includes a validation result indicating unsuccessful validation (i.e., the user ID is not recognized) and the user ID to the authentication server 26.

Upon receipt of the authentication request 52 from the protected resource server 24, the authentication server 26 provides an authentication session response 54. It should be understood that the authentication response 54 is provided regardless of whether validation was successful or not, and the response 54 includes a feature which allows the user to re-enter the user ID.

In particular, if the validation result indicates successful validation, the authentication server 26 provides a genuine authentication session response 54 which includes a genuine set of artifacts and a password prompt back to the protected resource server 24 which then conveys the genuine authentication session response 54 to the user device 22 that had sent the access request 50 (e.g., presented as a web page or series of web pages). The genuine set of artifacts may include an earlier-selected picture, question, pass phrase, combinations thereof, etc. in order to authenticate the authentication server 26 to the user. If the user recognizes the genuine set of artifacts is correct, the user knows that the authentication server 26 is genuine and provides a password 56 in response to the password prompt (e.g., a PIN, an one-time use passcode, etc.) to authenticate with the authentication server 26, i.e., the protected resource server 24 receives the password 56 and conveys the password 56 to the authentication server 26. Upon receipt of the password 56, if the authentication server 26 successfully authenticates the user (i.e., if the user-provided password 56 matches an expected password), the authentication server 26 notifies the protected resource server 24 that authentication of the user is successful, and the protected resource server 24 responds by granting the user with access to the protected resource 30.

However, if the protected resource server 24 provides an authentication request 52 having a validation result indicating unsuccessful validation (i.e., when the protected resource server 24 does not recognize the user ID), the authentication server 26 provides a faux authentication session response 54 which includes a faux set of artifacts and a password prompt back to the protected resource server 24 which, in turn, conveys the faux authentication session response 54 to the user device 22 (e.g., presented as a web page or series of web pages). The faux set of artifacts may include a machine-selected picture, question, pass phrase, combinations thereof, etc. in order to appear as a genuine authentication session response. A legitimate user who has mistyped a user ID is able to re-enter a user ID. However, a malicious user is not able to determine whether a user ID is recognized by the server-side equipment 30. In particular, the malicious user is not able to distinguish between a genuine authentication session response and a faux authentication response since both types of responses include artifacts, prompts for passwords, and instructions to re-enter user IDs if the artifacts are not recognized. Accordingly, user enumeration is therefore prevented. Further details will now be provided with reference to FIG. 2.

Figure 2:
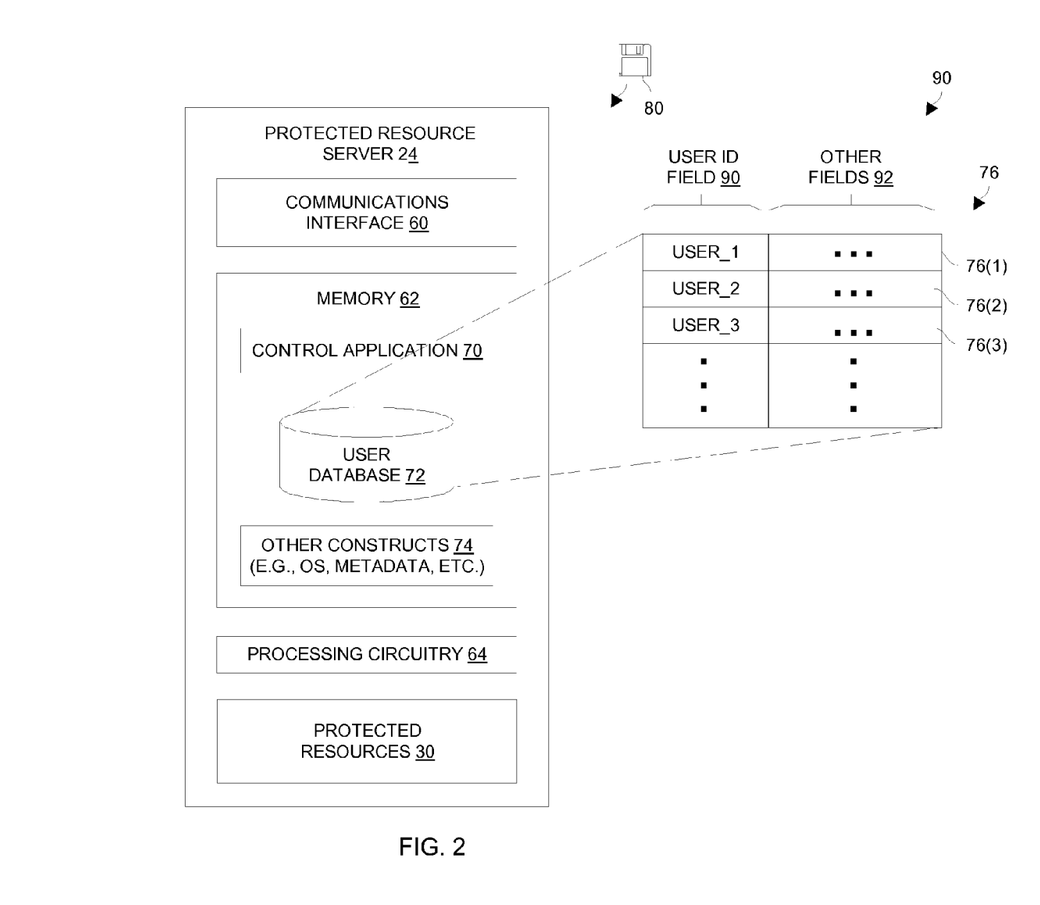
FIG. 2 is a block diagram of a protected resource server of the electronic environment of FIG. 1.

FIG. 2 shows particular details of the protected resource server 24 of the electronic environment 20. The protected resource server 24 includes a communications interface 60, memory 62, processing circuitry 64, and the protected resources 30, among other things. The memory 62 includes a set of software constructs including a control application 70, a user database 72, and other constructs 74.

The communications interface 60 is constructed and arranged to connect the protected resource server 24 to the communications medium 28. For example, the communications interface 60 may include a network adapter to connect to a public network such as the Internet, a wireless network router to offer wireless connectivity to users, and so on. Accordingly, the communications interface 60 enables the protected resource server 24 to communicate with the other components of the electronic environment 20 including the user devices 22 and the authentication server 26 (FIG. 1).

The memory 62 is intended to represent both volatile memory (e.g., DRAM, SRAM, etc.) and non-volatile memory (e.g., flash storage units, magnetic disk drives, etc.). The control application 70 controls the operation of the protected resource server 24. The user database 72 includes user entries 76(1), 76(2), 76(3), . . . (collectively, user entries 76) for valid users. The other constructs 74 represent the operating system, metadata to manage exchanges between the authentication server 26 and user devices 22, metadata to track user access of the protected resources 30, etc. The other constructs 74 may further include drivers, utilities and tools, user-level applications, GUIs, and so on.

The processing circuitry 64 is constructed and arranged to manage user access to the protected resources 30. In particular, the processing circuitry 64 when operating in accordance with the control application 70 performs validation operations, communicates with the authentication server 26 to effectuate authentication, and controls access to the protected resources 30.

It should be understood that the processing circuitry 64 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 80 is capable of delivering some or all of the software to the protected resource server 24. The computer program product 80 has a non-transitory (or non-volatile) computer readable medium which stores a set of instructions which controls one or more operations of the protected resource server 24. Examples of suitable computer readable storage media include tangible articles of manufacture and apparatus which store instructions in a non-volatile manner such as CD-ROM, flash memory, disk memory, tape memory, and the like.

As shown in the caption 90, each user entry 76 of the user database includes multiple fields. In particular, each user entry 76 includes a user ID field 90 to hold a user ID identifying a user, and other fields 92 to hold other information (e.g., account information, user privileges, access history, etc.).

During user validation, when a user sends an access request 50 (FIG. 1) to the protected resource server 24, the processing circuitry 64 extracts a user ID from the access request 50 and searches the user database 72 to determine whether the user is a valid user. The processing circuitry 64 then outputs a validation result indicating whether there is a user entry 76 in the user database 72 which contains the user ID. If the processing circuitry 64 finds a user entry 76 containing the user ID in the user ID field 90, the processing circuitry 64 considers validation of the user to be successful, i.e., the protected resource server 24 recognizes the user.

However, if the processing circuitry 64 does not find any user entry 76 containing the user ID in the user ID field 90, the processing circuitry 64 considers validation of the user to be unsuccessful, i.e., the protected resource server 24 does not recognize the user. For example, the protected resource server 24 may not recognized the user of the user device 22(3) if that user is not in the user database 72. Further details will now be provided with reference to FIG. 3.

Figure 3:
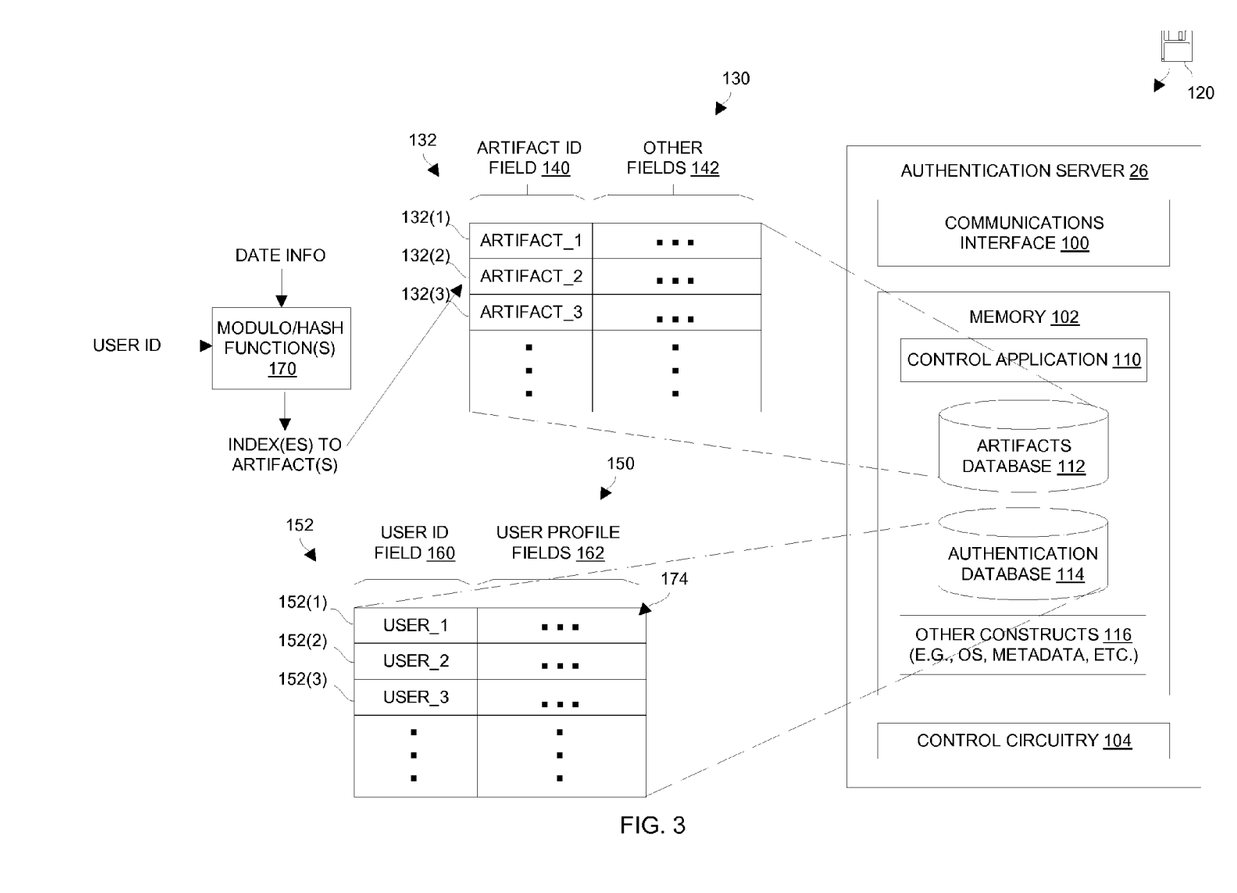
FIG. 3 is a block diagram of an authentication server of the electronic environment of FIG. 1.

FIG. 3 shows particular details of the authentication server 26 of the electronic environment 20. The authentication server 26 includes a communications interface 100, memory 102, and control circuitry 104, among other things. The memory 102 includes a set of software constructs including a control application 110, an artifacts database 112, an authentication database 114, and other constructs 116.

The communications interface 100 is constructed and arranged to connect the authentication server 26 to the communications medium 28. For example, the communications interface 100 may include a network adapter or dedicated communications pathway thus providing electronic connectivity to the protected resource server 24.

The memory 102 is intended to represent both volatile memory (e.g., DRAM, SRAM, etc.) and non-volatile memory (e.g., flash storage units, magnetic disk drives, etc.). The control application 110 controls the operation of the authentication server 26. The artifacts database 112 includes artifacts (e.g., pictures, questions, pass phrases, etc.) for use in authentication session responses 54 to users. The authentication database 114 includes user profile information to enable the authentication server 26 to authenticate users. The other constructs 116 represent the operating system, metadata to track authentication requests, etc. The other constructs 116 may further include drivers, utilities and tools, user-level applications, GUIs, and so on.

The control circuitry 104 is constructed and arranged to control the operation of the authentication server 26. In particular, the control circuitry 104 when operating in accordance with the control application 110 generates genuine and faux authentication sessions responses 54, and performs authentication operations to authenticate users (e.g., standard authentication, multi-factor authentication, authentication using OTPs, adaptive authentication in which the authentication operation generates risk scores identifying levels of risk, and so on), among other things.

It should be understood that the control circuitry 104 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 120 is capable of delivering some or all of the software to the authentication server 26. The computer program product 120 has a non-transitory (or non-volatile) computer readable medium which stores a set of instructions which controls one or more operations of the authentication server 26. Examples of suitable computer readable storage media include tangible articles of manufacture and apparatus which store instructions in a non-volatile manner such as CD-ROM, flash memory, disk memory, tape memory, and the like.

As shown in the caption 130, the artifacts database 112 includes artifact entries 132(1), 132(2), 132(3), . . . (collectively, artifact entries 132) having multiple fields. In particular, each artifact entry 132 includes an artifact ID field 140 holding an artifact ID to identify a particular artifact (e.g., a picture, a pass phrase, a question, pointers to such artifacts, etc.), and other fields 142 to hold other information (e.g., description information, etc.).

Likewise, as shown in the caption 150, the authentication database 114 includes user entries 152(1), 152(2), 152(3), . . . (collectively, user entries 152) having multiple fields. In particular, each user entry 152 includes a user ID field 160 holding a user ID to identify a particular user, and other fields 162 to hold other information (e.g., user profiles, authentication history, etc.).

During operation, when the protected resource server 24 sends an authentication request 52 to the authentication server 26 (also see FIG. 1), the control circuitry 104 of the authentication server 26 extracts the validation result and the user ID from the authentication request 52. The authentication server 26 then generates and returns an authentication session response 54 to the protected resource server 24.

In particular, if the validation result indicates that the protected resource server 24 recognized a user ID identifying a particular user, the control circuitry 104 of the authentication server 26 accesses the authentication database 114 based on the user ID and attempts to perform two-way authentication. That is, the control circuitry 104 finds the user entry 152 containing that user ID in the user ID field 160, and retrieves the user profile which identifies a set of artifacts that were chosen earlier by the particular user (e.g., artifacts which were pre-selected by the user corresponding to the user profile during a setup session). The control circuitry 104 then accesses the artifacts database 112 to retrieve the user-expected set of artifacts, and provides a genuine authentication session response 54 (FIG. 1) including that set of artifacts and a prompt for a password. The protected resource server 24 conveys the genuine authentication session response 54 to the user device 22 that initiated authentication to enable the user to authenticate the authentication server 26 (i.e., the user recognizes the user-expected set of artifacts and thus confirms that the authentication server 26 is legitimate). Additionally, the genuine authentication session response instructs the user to provide a password 56 to authenticate to the authentication server 26 (i.e., if the user-provided password 56 matches an expected password indicated by the user profile, authentication is successful).

However, if the validation result indicates that the protected resource server 24 did not recognize the user ID, the authentication server 26 provides a faux authentication session response 54 to the protected resource server 24 to prevent user enumeration. In particular, the control circuitry 104 of the authentication server 26 selects a set of artifacts from the artifacts database 112 and returns a faux authentication session response 54 which includes the machine-selected set of artifacts and a prompt for a password. The protected resource server 24 conveys the faux authentication session response 54 to the user device 22. In the event that the user is legitimate and does not recognize the machine-selected set of artifacts because the user simply mistyped the user's user ID, the user is able to re-enter the user ID to restart the process. On the other hand, if the user is malicious (e.g., a hacker trying to discover whether a user ID is used by the server-side equipment 32, also see FIG. 1), the user is unable to determine whether the user ID is valid since the user cannot distinguish between the received faux authentication session response and a genuine authentication session response.

It should be understood that there are a variety of ways for the control circuitry 104 of the authentication server 26 to select a set of artifacts from the artifacts database 112. In some arrangements, the control circuitry 104 treats the user ID as an input to a function 170 (see box 170 in FIG. 3). For example, the control circuitry 104 may consider the user ID as a number and take a modulo of the user ID in order to consistently generate an index (or indexes) 172 to a set of artifacts of the artifacts database 112. Accordingly, the machine-selected artifacts are not random, but repeat for the same user ID in a manner that simulates behavior for a valid user.

In some arrangements, the control circuitry 104 applies a hash function 170 to the user ID to generate such an index 172. In yet other arrangements, the control circuitry 104 inputs the user ID and data information (e.g., a current month) into a hash function 170 to generate a first index 172 for a period of time (e.g., a month) and generate a second index 172 after that period (e.g., the next month) to simulate user behavior of switching the repeatable fake artifact over time. Further details will now be provided with reference to FIG. 4.

Figure 4:
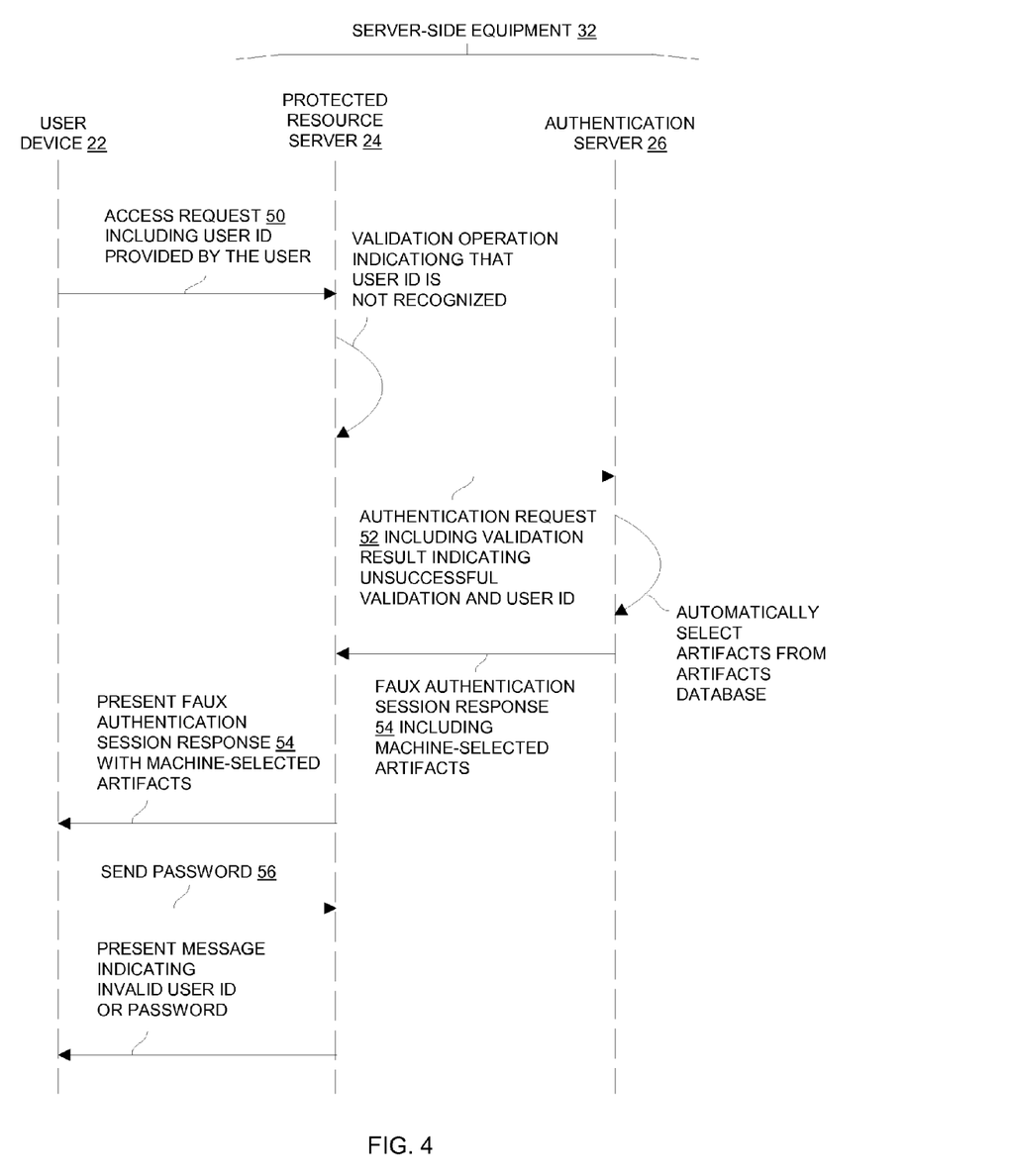
FIG. 4 is a sequence diagram illustrating particular activities/operations to prevent user enumeration.

FIG. 4 is a sequence diagram showing particular activities/operations which occur to prevent user enumeration. It should be understood that each user device 22, as well as the protected resource server 24 and the authentication server 26 forming the server-side equipment 32 communicate through the communications medium 28 (also see FIG. 1).

As illustrated in FIG. 4, a user of a user device 22 directs the user device 22 to submit an access request 50 to the protected resource server 24 to access a protected resource 30. In this situation, suppose that the access request 50 includes a user ID which is not recognized by the protected resource server 24. For example, the user may have mistyped the user ID. As another example, a malicious person may be attempting to guess a user ID used by the server-side equipment 32.

Upon receipt of the access request 50 from the user device 22, the protected resource server 24 performs a validation operation. In particular, the protected resource server 24 searches the user database 72 for a user entry 76 containing the user ID. Since the user database 72 does not have a user entry 76 containing the user ID (i.e., the user ID is not recognized), the protected resource server 24 sends the authentication server 26 an authentication request 52 including a validation result which indicates unsuccessful user validation, and the user ID.

Upon receipt of the authentication request 52 from the user device 22, the authentication server 26 determines that the authentication server 26 should return a faux authentication session response rather than a genuine authentication session response since the validation result indicates validation was unsuccessful. Accordingly, the authentication server 26 selects a set of artifacts from the artifacts database 112. The authentication server 26 then sends the faux authentication session response 54 including these machine-selected set of artifacts to the protected resource server 24.

The protected resource server 24 then presents the faux authentication session response 54 including the machine-selected set of artifacts to the user of the user device 22. Since the faux authentication session response 54 is indistinguishable from a genuine authentication session response, user enumeration is prevented.

At this point, the user may enter a password 56. For example, the user may be an attacker now trying to guess a password that would provide access. In response, the protected resource server 24 simply replies to the user indicating that the user has provided an invalid user ID or password.

It should be understood that the server-side equipment 32 is capable of being configured to perform remedial activities in the event of a failed validation and delivery of a faux authentication session response. For example, in some arrangements, the server-side equipment 32 is constructed and arranged to count a number of subsequent authentication session requests 50 caused by a user device 22 to provide a velocity measurement. The server-side equipment 32 outputs an alert message indicating occurrence of a possible enumeration attack when the velocity measurement exceeds a predetermined threshold (e.g., after five requests in a minute, after a dozen requests, etc.).

In some arrangements, the authentication server 26 includes a risk engine which is constructed and arranged to perform risk-based authentication (also referred to as adaptive authentication) in which multiple risk-based factors are evaluated to form a risk score indicating a level of risk. In these arrangements, user device identification (e.g., an IP address of with the user device 22 or Internet Service Provider, etc.) can be input to the risk engine to indicate increased risk in future risk-based authentication operations involving that user device 22.

In some arrangements, diagnostic content (e.g., a beacon or agent) is transparently provided to the user device 22 in response to the alert message. This diagnostic content facilitates further collection of identification information from the user device 22. For example, a small program can be included with a subsequent faux authentication session response 54 and, when the user device 22 runs the small program, the small program delivers additional information regarding the user device 22 to the authentication server 26. Further details will now be provided with reference to FIG. 5.

Figure 5:
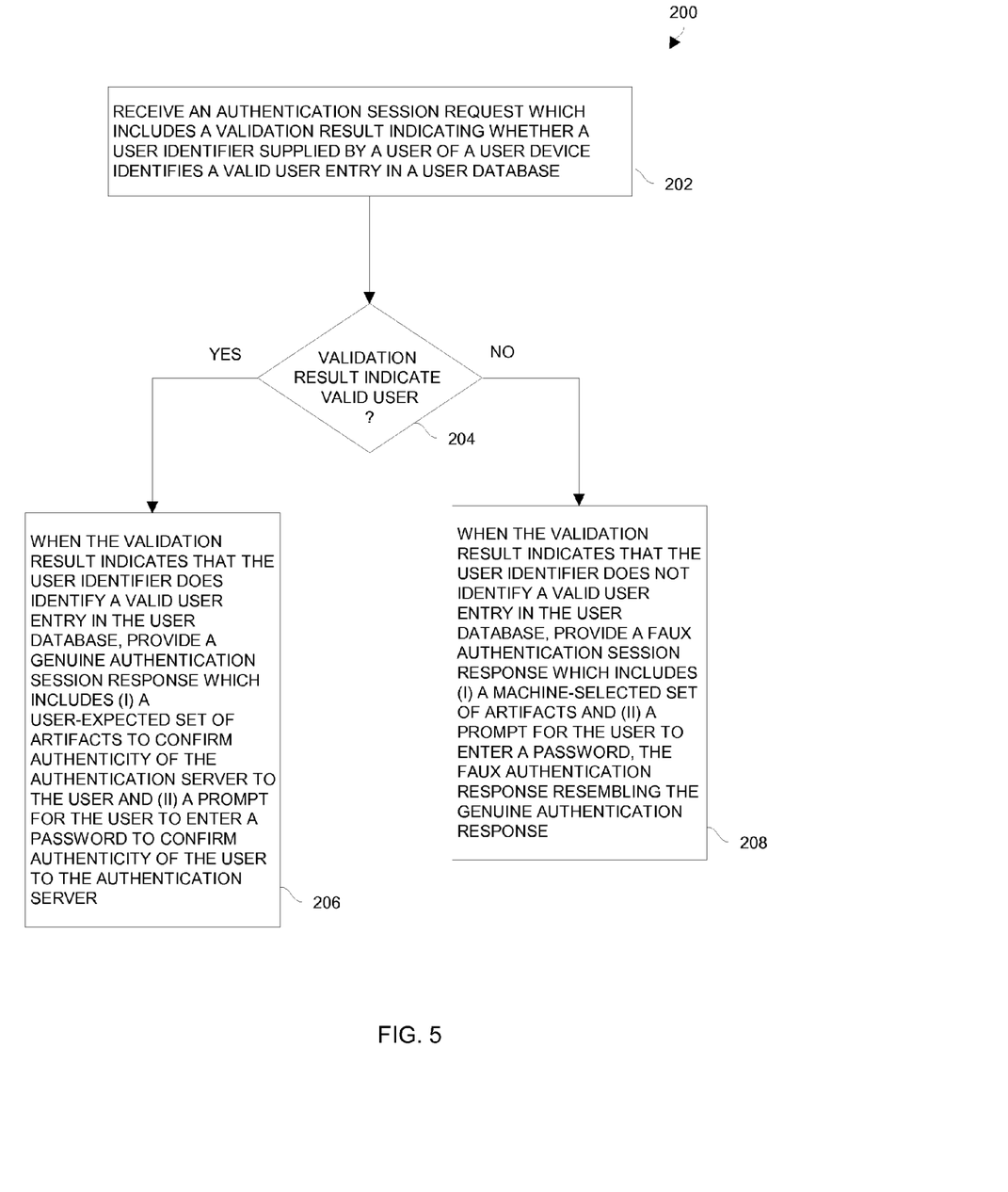
FIG. 5 is a flowchart of a procedure which is performed by server-side equipment of the electronic environment of FIG. 1 during user enumeration prevention.

FIG. 5 shows a procedure 200 which is performed by the authentication server 26 to prevent user enumeration. In step 202, the authentication server 26 receives an authentication session request 50 which includes a validation result indicating whether a user ID supplied by the user identifies a valid user entry in a user database (also see FIGS. 1 and 2).

In step 204, the authentication server 26 examines the validation result. If the validation result indicates that validation was successful, step 204 proceeds to step 206. However, if the validation result indicates that validation was unsuccessful, step 204 proceeds to step 208.

In step 206, when the validation result indicates that the user ID identifies a valid user entry in the user database, the authentication server 26 provides a genuine authentication session response 54 which includes (i) a user-expected set of artifacts to confirm authenticity of the authentication server 26 to the user and (ii) a prompt for the user to enter a password to confirm authenticity of the user to the authentication server 26. At this point, the authentication server 26 is able to continue authenticating the user when the user responds with the password.

In step 208, when the validation result indicates that the user ID does not identify a valid user entry in the user database, the authentication server 26 provides a faux authentication session response 54 which includes (i) a machine-selected set of artifacts and (ii) a prompt for the user to enter a password enabling the faux authentication session response to resemble a genuine authentication session response. Here, user enumeration is prevented since the user cannot distinguish a faux authentication session response from a genuine authentication session response.

As described above, improved techniques involve providing artificial or faux authentication session responses which resemble genuine authentication session responses from an authentication server 26. For example, in response to a recognized user ID such as a username from a user, suppose that the authentication server 26 is configured to authenticate to the user by providing evidence showing the user that the authentication server 26 is legitimate such as a picture or a catch phrase that was chosen earlier by the user. For this situation, the improved techniques may involve providing artificial evidence, i.e., pictures or catch phrases, even when the authentication server 26 does not recognize user IDs. Such operation prevents a malicious person from determining whether or not a user ID is actually used by the authentication server 26 since genuine authentication session responses as well as faux authentication session responses include evidence from the authentication server 26. To cover a situation in which a legitimate user mistypes a user ID which generates a faux authentication session response, the authentication server still offers the user an option of re-typing the user ID when the user does not recognize the artificial evidence of the faux authentication session response.

While various embodiments of the present disclosure have been particularly shown and described, it will be understood by those skilled in the art that various changes in form and details may be made therein without departing from the spirit and scope of the present disclosure as defined by the appended claims.

For example, it should be understood that certain activities/operations were described above as being performed by the protected resource server 24 and other activities/operations were described above as being performed by the authentication server 26 by way of example only. In other arrangements, the activities/operations are partitioned differently. For example, in some arrangements, the authentication server 26 may be provisioned with a user database 72 and be configured to perform user validation as well as user authentication. Other partitioning schemes are suitable for use as well.

Additionally, it should be understood that the various components of the server-side equipment 32 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that, in the above-provided description, each authentication session response 54 includes a set of artifacts as well as a prompt for a password. One should appreciate that the password prompt may be presented at the same time as the set of artifacts (e.g., on the same web page). Alternatively, the password prompt may be presented at a different time than that of the set of artifacts (e.g., on different web pages, following additional activities such as the proper answering of knowledge-based authentication questions, and so on). Such modifications and enhancements are intended to belong to various embodiments of the disclosure.

What is claimed is:

1. A method of prompting a user to authenticate to an authentication server, the method comprising:
   receiving, by processing circuitry, an authentication session request which includes a validation result indicating whether a user identifier supplied by the user identifies a valid user entry in a user database;
   when the validation result indicates that the user identifier does identify a valid user entry in the user database, providing a genuine authentication session response which includes (i) a user-expected set of artifacts to confirm authenticity of the authentication server to the user and (ii) a prompt for the user to enter a password to confirm authenticity of the user to the authentication server;
   when the validation result indicates that the user identifier does not identify a valid user entry in the user database, providing, by the processing circuitry, a faux authentication session response which includes (i) a server-selected set of artifacts and (ii) a prompt for the user to enter a password enabling the faux authentication session response to resemble a genuine authentication session response; and
   prior to receiving the authentication session request, acquiring a user-provided set of artifact choices, the user-provided set of artifact choices identifying, as the user-expected set of artifacts of the genuine authentication session response, user-chosen graphical content;
   wherein providing the faux authentication session response includes:
   outputting, as the server-selected set of artifacts, an artifact from an entry of an artifact database which is separate from the user database, and
   outputting, as the prompt for the user to enter a password, a password query which encourages a potential attacker to guess a password that would provide access to a protected resource; and
   wherein outputting the password query includes:
   inviting the user to guess a password to prevent revealing whether the user identifier supplied by the user identifies a valid user entry in the user database.

2. A method as in claim 1 wherein acquiring the user-provided set of artifact choices includes:
   providing a pool of selectable pictures for display on a user device and obtaining, as an artifact choice, a picture selection which identifies a particular picture from the pool of selectable pictures; and
   wherein the user-expected set of artifacts of the genuine authentication session response includes the particular picture identified by the picture selection.

3. A method as in claim 1 wherein acquiring the user-provided set of artifact choices includes:
   obtaining, as an artifact choice, a particular pass phrase; and
   wherein the user-expected set of artifacts of the genuine authentication session response includes the particular pass phrase.

4. A method as in claim 1 wherein acquiring the user-provided set of artifact choices includes:
   providing a pool of selectable pictures for display on a user device; obtaining from the user device (i) a picture selection which identifies a particular picture from the pool of selectable pictures as a first artifact choice, and (ii) a particular pass phrase as a second artifact choice;
   wherein the user-expected set of artifacts of the genuine authentication session response includes both the particular picture identified by the picture selection and the particular pass phrase.

5. A method as in claim 1 wherein acquiring the user-provided set of artifact choices includes:
   obtaining, as an artifact choice, a particular secret question;
   wherein the user-expected set of artifacts of the genuine authentication session response includes the particular secret question.

6. A method as in claim 1 wherein providing the genuine authentication session response includes:
   outputting, as the user-expected set of artifacts, viewable content which the user is able to render on a user device to confirm earlier selection of that viewable content.

7. A method as in claim 1 wherein the user database resides within a third-party server which is disposed between a user device of the user and the authentication server; and wherein receiving the authentication session request which includes the validation result includes:
    obtaining the authentication session request from the third-party server in response to the third-party server (i) receiving an access request from the user device, the access request including the user identifier, (ii) searching the user database based on the user identifier, and (ii) generating the validation result indicating whether the user identifier identifies a user entry in the user database.

8. A method as in claim 1 wherein a third-party server is disposed between the user and the authentication server; wherein the authentication server includes a front-end portion and a back-end portion; wherein the method further comprises:
    receiving, by the front-end portion, an access request from the user through the third-party server, the access request including the user identifier,
    searching, by the front-end portion, the user database based on the user identifier,
    generating, by the front-end portion, the validation result indicating whether the user identifier identifies a user entry in the user database, and
    providing, by the front-end portion, the authentication session request which includes the validation result to the back-end portion; and
wherein the back-end portion is constructed and arranged to process the authentication session request and provide one of the genuine authentication session response and the faux authentication session response to the user through the third-party server.

9. A method as in claim 1 wherein providing the faux authentication session response includes:
    inputting the user identifier into a hash algorithm to generate a repeatable hash result, and
    selecting, from a pool of machine-selectable sets of artifacts, the server-selected set of artifacts based on the repeatable hash result.

10. A method as in claim 9 wherein providing the faux authentication session response further includes:
    inputting a date value into the hash algorithm to effectuate (i) generation of the repeatable hash result for a predefined period of time and (ii) generation of different repeatable hash result after the predefined period of time to simulate user selection of a different set of artifacts over time.

11. A method as in claim 1 wherein the user initially supplies the user identifier from a user device; and wherein the method further comprises:
    after providing the faux authentication session response, counting a number of subsequent authentication session requests caused by a user device to provide a velocity measurement, and
    outputting an alert message indicating a possible enumeration attack when the velocity measurement exceeds a predetermined threshold.

12. A method as in claim 11 wherein the authentication server includes a risk engine which is constructed and arranged to perform risk-based authentication in which multiple risk-based factors are evaluated to form a risk score indicating a level of risk; and wherein the method further comprises:
    in response to the alert message, providing a user device identifier of the user device as an input to the risk engine to indicate increased risk in future risk-based authentication operations involving the user device.

13. A method as in claim 11, further comprising:
    providing diagnostic content transparently to the user device in response to the alert message, the diagnostic content facilitating further collection of identification information from the user device.

14. An authentication apparatus, comprising:
    a communications interface;
    memory which stores sets of artifacts; and
    control circuitry coupled to the communications interface and the memory, the control circuitry being constructed and arranged to:
        receive, through the communications interface, an authentication session request which includes a validation result indicating whether a user identifier supplied by a user identifies a valid user entry in a user database,
        when the validation result indicates that the user identifier does identify a valid user entry in the user database, provide, through the communications interface, a genuine authentication session response which includes (i) a user-expected set of artifacts from the memory to confirm authenticity of the authentication server to the user and (ii) a prompt for the user to enter a password to confirm authenticity of the user to the authentication server,
        when the validation result indicates that the user identifier does not identify a valid user entry in the user database, provide, through the communications interface, a faux authentication session response which includes (i) a server-selected set of artifacts from the memory and (ii) a prompt for the user to enter a password enabling the faux authentication session response to resemble a genuine authentication session response; and
        prior to receiving the authentication session request, acquire a user-provided set of artifact choices, the user-provided set of artifact choices identifying, as the user-expected set of artifacts of the genuine authentication session response, user-chosen graphical content;
    wherein the control circuitry, when providing the faux authentication session response, is constructed and arranged to:
        output, as the server-selected set of artifacts, an artifact from an entry of an artifact database which is separate from the user database, and
        output, as the prompt for the user to enter a password, a password query which encourages a potential attacker to guess a password that would provide access to a protected resource; and
    wherein the control circuitry, when outputting the password query, is constructed and arranged to:
        invite the user to guess a password to prevent revealing whether the user identifier supplied by the user identifies a valid user entry in the user database.

15. An authentication apparatus as in claim 14 wherein the control circuitry, when providing the faux authentication session response, is constructed and arranged to:
    input the user identifier into a hash algorithm to generate a repeatable hash result, and
    select, from a pool of machine-selectable sets of artifacts in the memory, the server-selected set of artifacts based on the repeatable hash result.

16. An authentication apparatus as in claim 15 wherein the control circuitry, when providing the faux authentication session response, is further constructed and arranged to:
input a date value into the hash algorithm to effectuate (i) generation of the repeatable hash result for a predefined period of time and (ii) generation of different repeatable hash result after the predefined period of time to simulate user selection of a different set of artifacts over time.

17. A computer program product having a non-transitory computer readable medium which stores a set of instructions to prompt a user to authenticate to an authentication server, the set of instructions, when carried out by the authentication server, causing the authentication server to perform a method of:
receiving an authentication session request which includes a validation result indicating whether a user identifier supplied by the user identifies a valid user entry in a user database;
when the validation result indicates that the user identifier does identify a valid user entry in the user database, providing a genuine authentication session response which includes (i) a user-expected set of artifacts to confirm authenticity of the authentication server to the user and (ii) a prompt for the user to enter a password to confirm authenticity of the user to the authentication server;
when the validation result indicates that the user identifier does not identify a valid user entry in the user database, providing a faux authentication session response which includes (i) a server-selected set of artifacts and (ii) a prompt for the user to enter a password enabling the faux authentication session response to resemble a genuine authentication session response; and
prior to receiving the authentication session request, acquiring a user-provided set of artifact choices, the user-provided set of artifact choices identifying, as the user-expected set of artifacts of the genuine authentication session response, user-chosen graphical content;
wherein providing the faux authentication session response includes:
outputting, as the server-selected set of artifacts, an artifact from an entry of an artifact database which is separate from the user database, and
outputting, as the prompt for the user to enter a password, a password query which encourages a potential attacker to guess a password that would provide access to a protected resource; and
wherein outputting the password query includes:
inviting the user to guess a password to prevent revealing whether the user identifier supplied by the user identifies a valid user entry in the user database.

18. A computer program product as in claim 17 wherein providing the faux authentication session response includes:
inputting the user identifier into a hash algorithm to generate a repeatable hash result, and
selecting, from a pool of machine-selectable sets of artifacts, the server-selected set of artifacts based on the repeatable hash result.

19. A computer program product as in claim 18 wherein providing the faux authentication session response further includes:
inputting a date value into the hash algorithm to effectuate (i) generation of the repeatable hash result for a predefined period of time and (ii) generation of different repeatable hash result after the predefined period of time to simulate user selection of a different set of artifacts over time.

20. An authentication apparatus as in claim 14 wherein the control circuitry, when acquiring the user-provided set of artifact choices, is constructed and arranged to:
provide a pool of selectable pictures for display on a user device and obtain, as an artifact choice, a picture selection which identifies a particular picture from the pool of selectable pictures; and
wherein the user-expected set of artifacts of the genuine authentication session response includes the particular picture identified by the picture selection.

21. An authentication apparatus as in claim 14 wherein the control circuitry, when acquiring the user-provided set of artifact choices, is constructed and arranged to:
obtain, as an artifact choice, a particular pass phrase; and
wherein the user-expected set of artifacts of the genuine authentication session response includes the particular pass phrase.

22. A computer program product as in claim 17 wherein acquiring the user-provided set of artifact choices includes:
providing a pool of selectable pictures for display on a user device and obtaining, as an artifact choice, a picture selection which identifies a particular picture from the pool of selectable pictures; and
wherein the user-expected set of artifacts of the genuine authentication session response includes the particular picture identified by the picture selection.

23. A computer program product as in claim 17 wherein acquiring the user-provided set of artifact choices includes:
obtaining, as an artifact choice, a particular pass phrase; and
wherein the user-expected set of artifacts of the genuine authentication session response includes the particular pass phrase.

\* \* \* \* \*